United States Patent
Greenspan et al.

(10) Patent No.: US 10,372,202 B1
(45) Date of Patent: Aug. 6, 2019

(54) POSITIONING A CURSOR ON A DISPLAY MONITOR BASED ON A USER'S EYE-GAZE POSITION

(71) Applicant: CA, Inc., Islandia, NY (US)

(72) Inventors: Steven L. Greenspan, Scotch Plains, NJ (US); Robert Biddle, Ottawa (CA); Judith M. Brown, Kanata (CA)

(73) Assignee: CA, Inc., New York, NY (US)

( * ) Notice: Subject to any disclaimer, the term of this patent is extended or adjusted under 35 U.S.C. 154(b) by 504 days.

(21) Appl. No.: 14/159,263

(22) Filed: Jan. 20, 2014

(51) Int. Cl.
*G06F 3/01* (2006.01)
*G06F 3/033* (2013.01)

(52) U.S. Cl.
CPC .............. *G06F 3/013* (2013.01); *G06F 3/033* (2013.01)

(58) Field of Classification Search
CPC ................................. G06F 3/033; G06F 3/048
See application file for complete search history.

(56) References Cited

U.S. PATENT DOCUMENTS

| | | | |
|---|---|---|---|
| 6,078,310 A | 6/2000 | Tognazzini | |
| 2004/0098462 A1 | 5/2004 | Horvitz et al. | |
| 2006/0037038 A1 | 2/2006 | Buck | |
| 2006/0214911 A1* | 9/2006 | Miller | G06F 3/012 |
| | | | 345/157 |
| 2011/0141010 A1 | 6/2011 | Sakata et al. | |
| 2012/0113235 A1 | 5/2012 | Shintani | |
| 2012/0272179 A1* | 10/2012 | Stafford | G06F 3/012 |
| | | | 715/781 |

OTHER PUBLICATIONS

Bojko, A., "The Truth About Webcam Eye Tracking." Online article posted Oct. 12, 2011. Accessed Aug. 28, 2013 at http://rosenfeldmedia.com/blogs/eye-tracking-the-ux/the-truth-about-webcam-eye-tra/. Rosenfeld Media, Brooklyn, NY.
Kumar, M., "Reducing the Cost of Eye Tracking Systems." Stanford Tech Report CSTR Aug. 2006, Apr. 2006. Stanford University, Stanford, CA.
"MultiMonitor TaskBar." Product information. 5 pages. Viewed at http://mediachance.com/free/multimon.htm. Oct. 24, 2013. MediaChance, Ottawa, ON, Canada.
"DisplayFusion: multiple monitors made easy." Product information. 3 pages. Viewed at http://displayfusion.com. Jan. 2, 2014. Binary Fortress Software, Kanata, ON, Canada.
Kocejko, T. et al., "Gaze tracking in multi-display environment", Human System Interaction 2013 6th International Conference, Jun. 6-8, 2013, pp. 626-631, Sopot, Poland.

* cited by examiner

*Primary Examiner* — William Boddie
(74) *Attorney, Agent, or Firm* — Meyertons, Hood, Kivlin, Kowert & Goetzel, P.C.

(57) ABSTRACT

A computing device has a camera and tracks the movement of a user's eye as the user looks at a display monitor. Upon detecting that a user is unable to locate the position of a cursor on the display monitor, the computing device displays the cursor at a conspicuous location on the display monitor so that the user is likely to find the cursor. The location at which the cursor is conspicuously displayed is selected by the computing device based on an analysis of the user's eye movements.

17 Claims, 5 Drawing Sheets

POSITIONING A CURSOR ON A DISPLAY MONITOR BASED ON A USER'S EYE-GAZE POSITION

BACKGROUND

The present disclosure relates to computer systems, and more particularly, to computer systems, computer devices, and computer-implemented methods for positioning a mouse cursor based on where a user is looking.

Many home and work environments now support having multiple display monitors for a single user workstation. These multiple displays allow users to work on a plurality of different user applications with windows from each application appearing on one of the display monitors. Typically, through the use of software and hardware circuits at the workstation, the user can move a mouse cursor between the display monitors to give focus to a desired one of the windows and interact with their respective applications.

Often times, users "lose" the location of the mouse cursor on the display. That is, under some circumstances, the user may not be able to locate the mouse cursor on the display screen. For example, with some word processing applications, the cursor typically disappears from the display or is "hidden" from view whenever a user begins to type. In other cases, the cursor simply disappears from the display. Such disappearances may occur inadvertently, for example, when the user is installing new software.

When users are unable to find the cursor, they generally move the mouse rapidly in a quasi-circular motion, for example, until they see the mouse cursor move on the display screen. However, such attempts to locate the mouse cursor on the display can be frustrating.

BRIEF SUMMARY

The present disclosure provides a system, device, and computer-implemented method for displaying a cursor, such as a mouse cursor, for example, at a position on a display monitor that is at or near a determined eye-gaze position for the user. Particularly, the present disclosure determines where on the display monitor the user is currently focusing his or her gaze. So informed, application programs executing on a device may conspicuously display the cursor at a position on the display monitor that is within the user's field of vision so that the user is highly likely to find the cursor.

To accomplish this, the present disclosure provides, in one embodiment, a computer-implemented method that comprises detecting that a user is unable to locate a cursor on a display monitor connected to a computing device. Responsive to the detection, the computer implementing the method determines an eye-gaze position for the user. The eye-gaze position comprises a location on the display monitor at which the user is currently looking. The method then calls for displaying the cursor on the display monitor to the user based on the determined eye-gaze position. The cursor is conspicuously displayed at the eye-gaze position so that the user is highly likely to see the cursor.

In another aspect, the present disclosure provides a computing device. In this embodiment, the computing device comprises a display monitor that displays a cursor, a camera to capture images, a memory circuit to store an eye-gaze application program, and a programmable processing circuit.

The eye-gaze program receives an image of a user's eye captured by the camera. The programmable processing circuit, which is communicatively connected to the display monitor, the camera, and the memory, is configured to detect that the user is unable to locate a cursor on the display monitor, determine an eye-gaze position for the user responsive to detecting that the user is unable to locate the cursor on the display monitor, and display the cursor on the display monitor to the user based on the determined eye-gaze position. In this embodiment, the eye-gaze position is based on images of the user's eye captured by the camera, and comprises a location on the display monitor at which the user is currently looking.

In another embodiment, the present disclosure provides a computer program product comprising a non-transitory computer readable medium. The computer readable medium stores a control application that, when executed by a computing device, configures a programmable processing circuit associated with the computing device to detect that the user is unable to locate a cursor on a display monitor. Responsive to the detection, the control application further controls the programmable processing circuit to determine an eye-gaze position for the user. The eye-gaze position is a location at which the user is currently looking on the display monitor, and is determined based on the image of the user's eye captured by the camera. The control application then controls the programmable processing circuit, based on the determined eye-gaze position, to display the cursor on the display monitor to the user.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
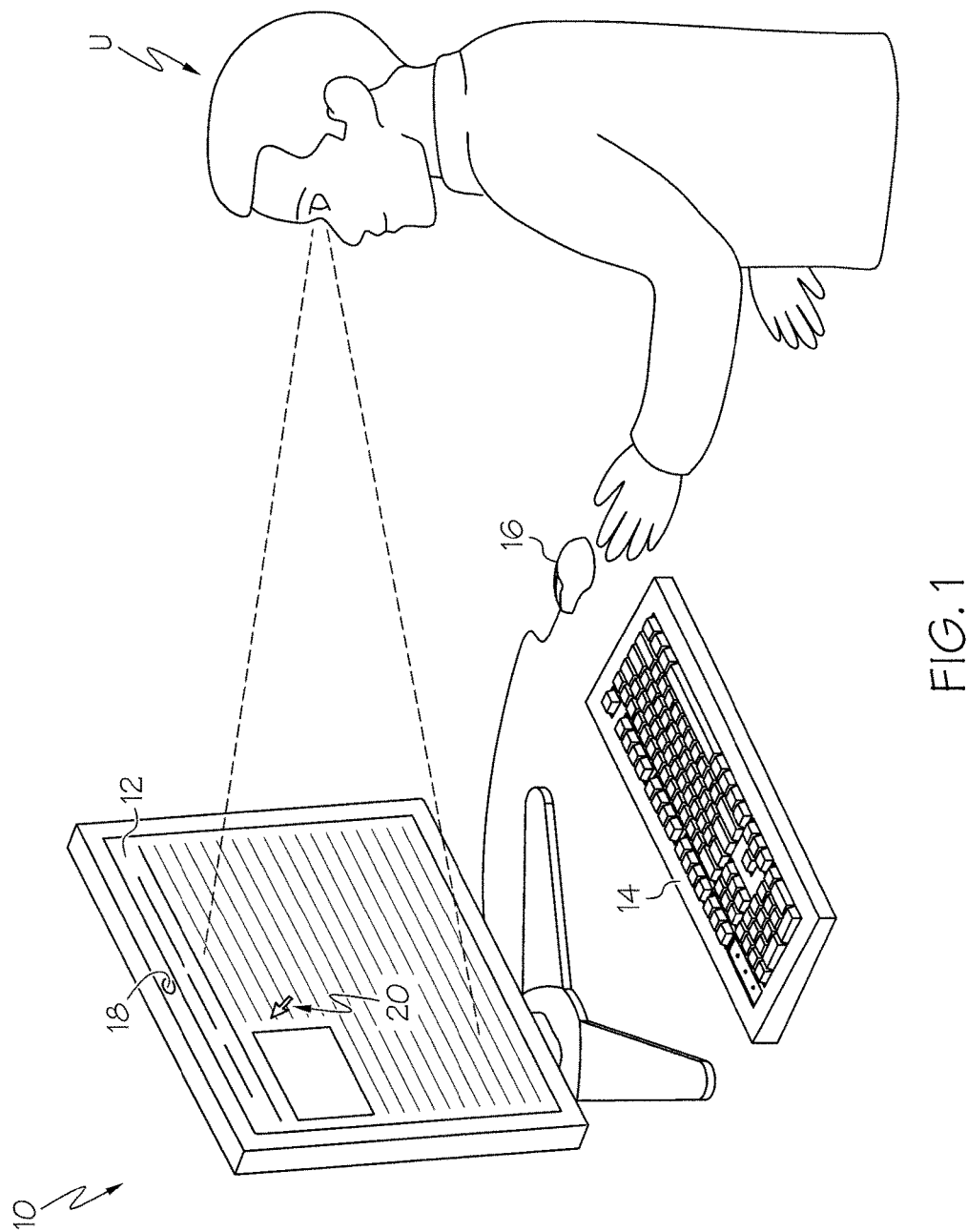
FIG. 1 is a perspective view illustrating a display monitor displaying a mouse cursor in accordance with one aspect of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system, device, and computer-implemented method for displaying a mouse cursor at a position on a display monitor that is at or near a determined eye-gaze position for the user. More particularly, embodiments of the present disclosure leverage the functionality of camera devices that are integrated into, or associated with, the display monitors connected to computing device. The embodiments determine whether a user is currently looking at a display monitor, and if so, where on the display monitor the user is currently focusing his or her gaze. In embodiments where the user has multiple monitors, the camera devices may also be utilized to determine at which specific monitor the user is currently looking. So informed, application programs may display the mouse cursor at a position on the display monitor that is most likely to be seen by the user (i.e., within the user's field of vision such as the position at which the user is currently focusing his or her gaze).

Computing devices configured according to the aspects of the present disclosure may allow users to be more productive and avoid frustration. For example, many desktop computing systems are configured with multiple display monitors. A user that is interacting with an application, such as a word processing application, for example, may, "lose" the position of the mouse cursor from time-to-time. That is, applications, such as MICROSOFT WORD, for example, sometimes "hide" the mouse cursor (i.e., make the mouse cursor not visible) when the user begins typing on a keyboard to enter text. The application does not generally make the cursor visible again until the user moves the mouse.

However, users usually forget where the mouse cursor was positioned on the display before it was hidden. To once again "find" a "lost" mouse cursor, the user typically moves the mouse repeatedly in a pseudo-circular or rapid back-and-forth motion, and looks for the cursor movement on the display screen. As stated above, this method of locating the mouse cursor can be frustrating for a user, and may negatively affect a user's productivity.

In accordance with the present disclosure, therefore, an application program executing on the user's computing device is configured to detect whenever the user has "lost" the mouse cursor, and in response, conspicuously display the mouse cursor on the display monitor in an area in which a user has the highest chance of noticing the cursor. Not only does this approach reduce the frustration and disorientation of the user, but it also allows the user to continue working.

Turning now to the drawings, FIG. 1 is a block diagram illustrating a computing device 10 configured according to one embodiment of the present disclosure. The computing device 10 may comprise, for example, a user's desktop or laptop computer; however, those of ordinary skill in the art should appreciate that the depiction of computing device 10 as a desktop computer is for illustrative purposes only. In other embodiments, the computing device 10 comprises a tablet or notebook computer, a network server, a personal communication device such as a cellular telephone, for example, or any other computing device with which a user U may interact.

The computing device 10 of this embodiment comprises a display monitor 12, a keyboard 14, and a mouse 16. The functions of these components are well-known in the art, and thus, not described in detail here. However, it is enough to understand that each of these devices 12, 14, 16 facilitates user U interacting with various applications programs executing on computing device 10. Specifically, the keyboard 14 and mouse 16 are examples of user input devices that allow user U to provide input into the computing device 10, and display monitor 12 is an example of a user output device that displays output to the user. In some embodiments, display monitor 12 may comprise a touch-sensitive display. Thus, display monitor 12 may also function as a user input device in some embodiments.

As seen in FIG. 1, computing device also comprises a camera 18. In most cases, camera 18 is integrated into the housing of the display monitor 12 and allows the user to perform functions such as capture images and join in web conferences, for example. According to embodiments of the present disclosure, however, the camera 18 is also utilized by a software application executing on computing device 10 to determine whether the user is currently looking at display monitor 12. If so, image information captured by camera 18 is employed to allow the computing device 10 to conspicuously display a mouse cursor on the display monitor 12 at or near a position at which the user is currently looking.

This determined position on the display monitor 12 is referred to herein as the user's "eye-gaze position," and is provided according to embodiments of the disclosure to a control application and/or the operating system of computing device 10. Specifically, as described in more detail later, these applications utilize the determined eye-gaze position information to intelligently display the mouse cursor conspicuously on the display monitor 12. That is, since the control application is aware of the user's current eye-gaze position, it is able to conspicuously display the mouse cursor 20 at a location on the display monitor 12 such that the user has the best chance of noticing the mouse cursor 20.

Those of ordinary skill in the art should appreciate that while the previous embodiment is illustrated in terms of a computer device 10 having a single display monitor 12, the present disclosure is not limited only to such devices. In other embodiments, such as the embodiment seen in FIG. 2, the present disclosure may also be applied to computing devices 30 having multiple display monitors 12.

Figure 2:
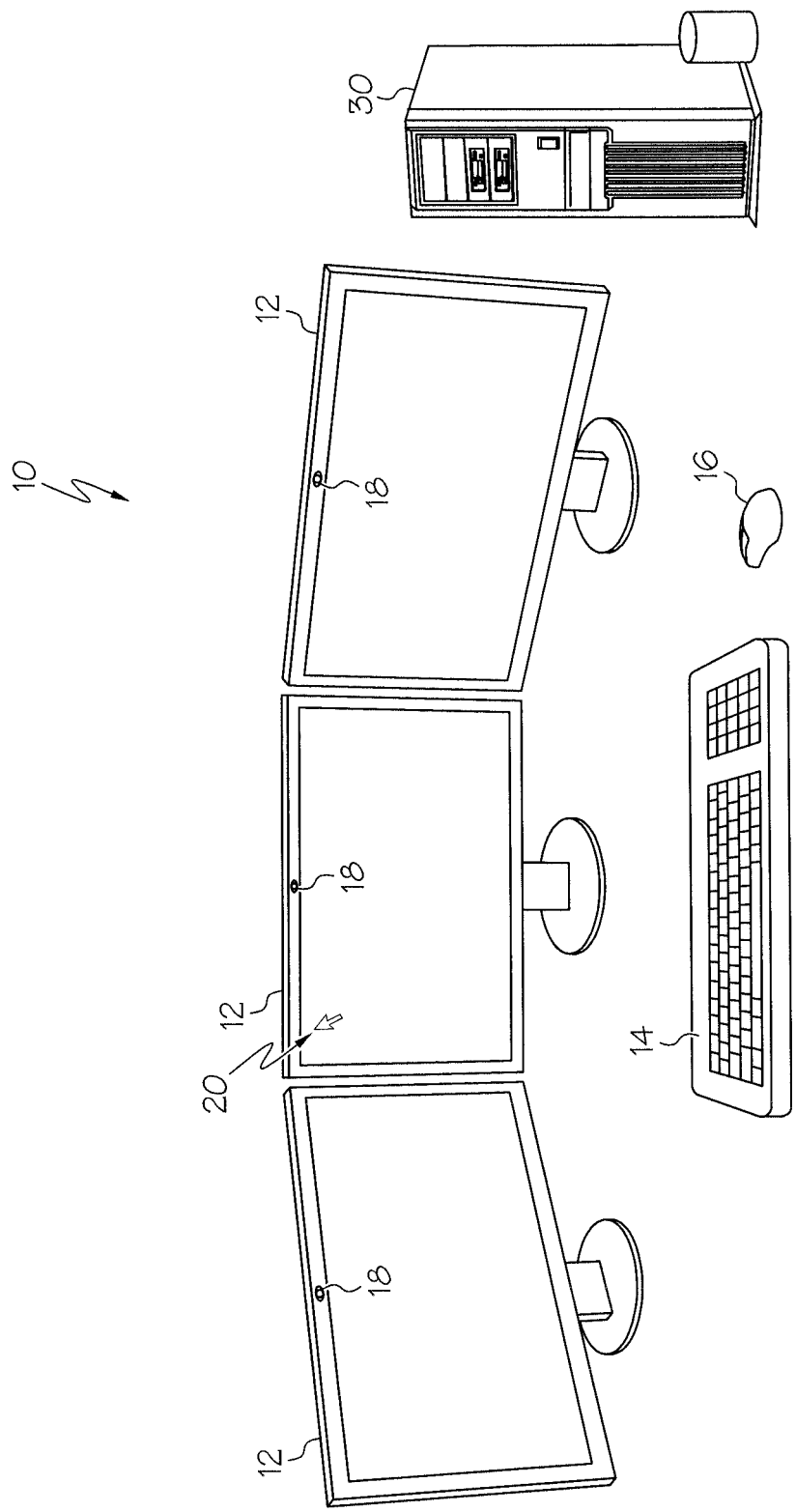
FIG. 2 is a perspective view illustrating a computer device having multiple display monitors and displaying a mouse cursor in accordance with one aspect of the present disclosure.

As seen in FIG. 2, computing device 30 operatively connects to a plurality of display monitors 12. Such architectures are not uncommon, and may be found, for example, in both single-user environments (e.g., home) and work environments. One particular type of environment such a multiple display system may be found is in a call center, for example. With such multi-monitor systems, software and hardware circuits that are well-known in the art execute on computing device 30 to allow a plurality of different user applications to activate different windows on each of the display monitors 12. This same software and hardware also allows a mouse cursor controlled by the user to move between different display monitors 12 to allow the user to interact with the different application windows displayed on those monitors 12.

As in the single display systems, such as that seen in FIG. 1, the user may, from time-to-time, "lose" track of the mouse cursor 20 while interacting with an application program in one of the associated windows. However, with multiple display monitors 12, there may be an increased amount of frustration for the user U when attempting to find the mouse cursor 20 on one of the display monitors 12. Therefore, in one embodiment, a control application executing on computing device 30 determines which of the multiple display monitors 12 the user is currently looking at, and then provides that information to a user application, or the operating system, executing on computing device 30. Based on this information—i.e., the user's determined "eye-gaze" position—the user application or operating system executing on computing device 30 executes a function to conspicuously display the mouse cursor at a position on the display monitor 12 at which the user is looking.

To accomplish this aspect, each of the display monitors 12 is equipped with an integrated camera 18 that captures images of the user's eyes from different angles. A control application executing on the computing device 30 then processes the images, and based on the results, determines whether the user is currently looking at one of the display monitors 12. If so, the control application determines which display monitor user U is currently looking at, and in some embodiments, the particular position on the display monitor 12 at which user U is currently looking. So determined, the user applications executing on computing device 30 can utilize this "eye-gaze" information to conspicuously display the mouse cursor in an area of the display 12 such that the user has the best chance of noticing the mouse cursor.

In some cases, the computing devices 20, 30 may determine that a user is not currently looking at one of its display monitors 12. In situations such as these, aspects of the present disclosure may simply display the mouse cursor at a default position on a default display monitor.

As previously stated, the present disclosure utilizes an eye-gaze determination software program, in cooperation with the hardware circuitry associated with computer device 10 (and/or computer device 30), is used to track the eye movements of user U. As those of ordinary skill in the art will appreciate, there are many different programs and methods available for determining a user's eye-gaze position, each with their own corresponding system and method of tracking the movement of a user's eye. Thus, the technology needed for such tracking is well-known and not described in detail herein. However, a brief explanation is included herein for completeness.

Generally, eye-gaze determination software receives images of a user's eye movements that are captured by a camera, such as camera 18. The software then processes the captured images according to well-known algorithms to distinguish the circular presentation of eye elements, such as the pupil and the iris. These eye elements appear more circular when the user is gazing at an area of the display monitor 12 that is near the camera 18. However, those same eye elements appear more elliptical when the user is gazing at the display monitor at an angle that is away from the camera 18. Thus, based on the elliptical presentations of the eye elements, the eye-gaze software identifies the particular angles at which the user is looking at the display monitor 12, and from these angles, can determine which particular display monitor 12, and where on that particular display monitor 12, the user is currently looking.

As was seen in FIG. 1, for example, the camera 18 captures images of the user's eyes as the user gazes at an area of the display monitor 12. As above, the eye-gaze software program utilized in embodiments of the present disclosure process the images to determine that the user U is currently focused on or looking at the top-left region of the display monitor 32. The user's U eye-gaze position information, which may comprise an identifier for the display monitor 12 and/or a coordinate position defining where the user is looking, is then saved to a log file, for example, or communicated to an application program currently in use by the user (e.g., currently having focus). The user's U eye-gaze position information may be provided to the application program autonomously, or in response to an explicit request issued by the application program. Regardless of how the user's U eye-gaze position information is provided, however, the application program, which may be executing on the computing device 10 (or on computing device 30), generates the messaging needed for the computer device 10 (or computing device 30) to conspicuously display the mouse cursor to the top-left region of the display monitor. Because the user U is currently looking at this area of the display monitor 12, the user's U chance at noticing the mouse cursor are greatly increased.

In this embodiment, the application that has the current window focus is the application that utilizes the eye-gaze position information to conspicuously display the mouse cursor. Those of ordinary skill in the art should realize, however, that this is for illustrative purposes only. In other embodiments, the operating system (OS) executing on computing device 10 (or on computing device 30) is modified to utilize the eye-gaze information when displaying a mouse cursor.

Particularly, as is known in the art, the OS receives messages from user applications to move the mouse cursor 20 around the display monitors 12. Those messages will generally identify where on a given monitor the mouse cursor 20 is to be positioned. According to the present disclosure, however, rather than have the user application specify such a position in the message to the OS, the OS could be configured to track the user's U current eye-gaze position, and automatically display the mouse cursor 20 at the current eye-gaze position.

Figure 3:
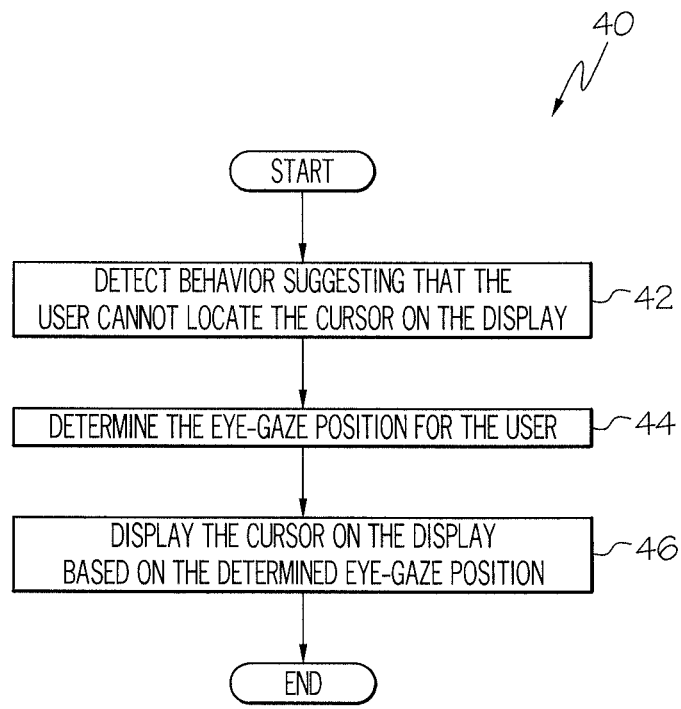
FIG. 3 is a flow diagram illustrating a method for displaying a mouse cursor on a display based on a user's measured eye-gaze position according to one aspect of the present disclosure.

FIG. 3 is a flow diagram illustrating a method 40 of performing an embodiment of the present disclosure. The method 40 may be performed by computing device 10, in cases of single-display systems, or by computing device 30, in cases of systems having multiple displays.

Method 40 begins with an application program, such as a user application executing on one of the computing devices 10, 30, detecting a behavior of user U indicating that user U has "lost" the mouse cursor 20 (box 42). As described in more detail below, the indication may be, for example, a rapid "back-and-forth" motion of the mouse device 16 by the user, a repeated quasi-circular motion of the mouse device 16, or an indication based on the detected eye movements of the user.

Responsive to detecting an indication that the user cannot locate the mouse cursor 20, the user application determines the eye-gaze position for the user U (box 44). As previously stated, the eye-gaze position may be tracked and determined by an eye-gaze software program utilizing images of the user's eyes captured by camera 18. The determined eye-gaze positions are then saved to a log file or provided to the user application upon request by the user application. Based on the eye-gaze position, the user application conspicuously displays the mouse cursor 20 on the display monitor 12 (box 46).

Figure 4A:
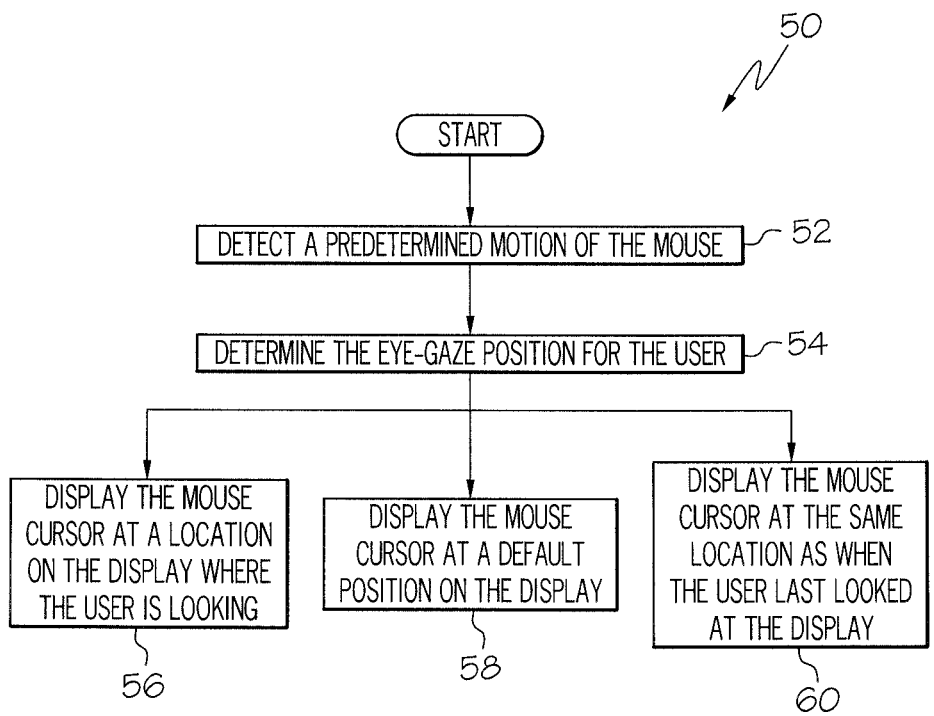
FIGS. 4A-4C are flow diagrams illustrating methods for displaying a mouse cursor based on a user's measured eye-gaze position according to embodiments of the present disclosure.

FIG. 4A is a flow diagram illustrating a method 50 for determining an eye-gaze position for a user U, and conspicuously displaying the mouse cursor 20 on the display monitor 12 based on the determined eye-gaze position. As above, method 50 may be utilized for both single-display monitor embodiments and multi-display monitor embodiments, although for illustrative purposes, method 50 is described in terms of a single-display embodiment.

Method 50 begins with the user application detecting that user U cannot locate the mouse cursor 20 on the display monitor 12. Although such detection may be made based on any known trigger or condition, in one embodiment, described in more detail below, the user application executing on computing device 10 detects the indication by detecting that the user U is moving the mouse device 16 in a rapid, repeated motion (box 52). Such motions include, but are not limited to, the repeated movement of the mouse device 16 in a quasi-circular motion, and the rapid movement of the mouse device 16 in a back-and-forth motion.

Regardless of how the condition is detected, however, the user application executing on computing device 10 then determines the eye-gaze position for the user U (box 54). Particularly, the user application executing on computing device 10 determines whether the user U is or is not looking at the display monitor 12. If the user is looking at the display monitor 12, the user application will first reference the eye-gaze position information to determine which display monitor 12 the user is currently looking at. As previously described, this determination may be made based on the analysis of the elliptical presentations of the user's eye elements performed by the eye-gaze software program. The user application then utilizes the eye-gaze information to further identify the particular region on the display monitor 12 at which the user is currently looking.

For example, the user application may generate and send a request for the eye-gaze data to a control application executing on computing device 10 that is responsible for monitoring and/or tracking the user's U eye movements. In response, the control application would provide the user application with that data in a return message. Alternatively, the user application may read the user's eye-gaze position from a file stored in memory. As those of ordinary skill in the art will understand, there are other ways in which the user application can determine the user's U eye-gaze position. However, once determined, the user application can control the computing device 10 to display the mouse cursor in a particular position on the display monitor 12 to ensure that the user U has the best chance of seeing the mouse cursor 20.

In one embodiment, for example, the user application generates a message to the OS to display the mouse cursor 20 at or near the location where the user is currently looking (box 56). More specifically, the user application generates the message to ensure that the OS conspicuously displays the mouse cursor 20 within the user's U field of vision.

In some cases, the eye-gaze software program may not be able to identify the eye-gaze position. For example, the user may be away from the computing device 10 or simply looking at the keyboard. In such situations, the user application will determine an alternate or default location on the display monitor 12 to conspicuously display the mouse cursor (box 58). For example, in single-display embodiments, the user application may identify a conspicuous predetermined location on the display monitor 12, such as the center of the display monitor 12, as the location in which to display the mouse cursor 20. In multi-display embodiments, however, the user application may first identify a predefined one of the display monitors 12, and then display the mouse cursor 20 in a conspicuous predetermined location on the identified display monitor 12 (e.g., the center of the display monitor 12). The predetermined display monitor and/or location on the display monitor may be predetermined and coded into the user application, or contained and stored in a memory in a configuration file or user profile accessible to the user application.

In another embodiment, the user application may control the computing device 10 to conspicuously display the mouse cursor 20 at the same location as when the user last looked at the display monitor 12 (box 60). In these embodiments, the coordinates on the display monitor 12 may be tracked and stored in a configuration file or user profile, and retrieved from memory as previously described.

Figure 4B:
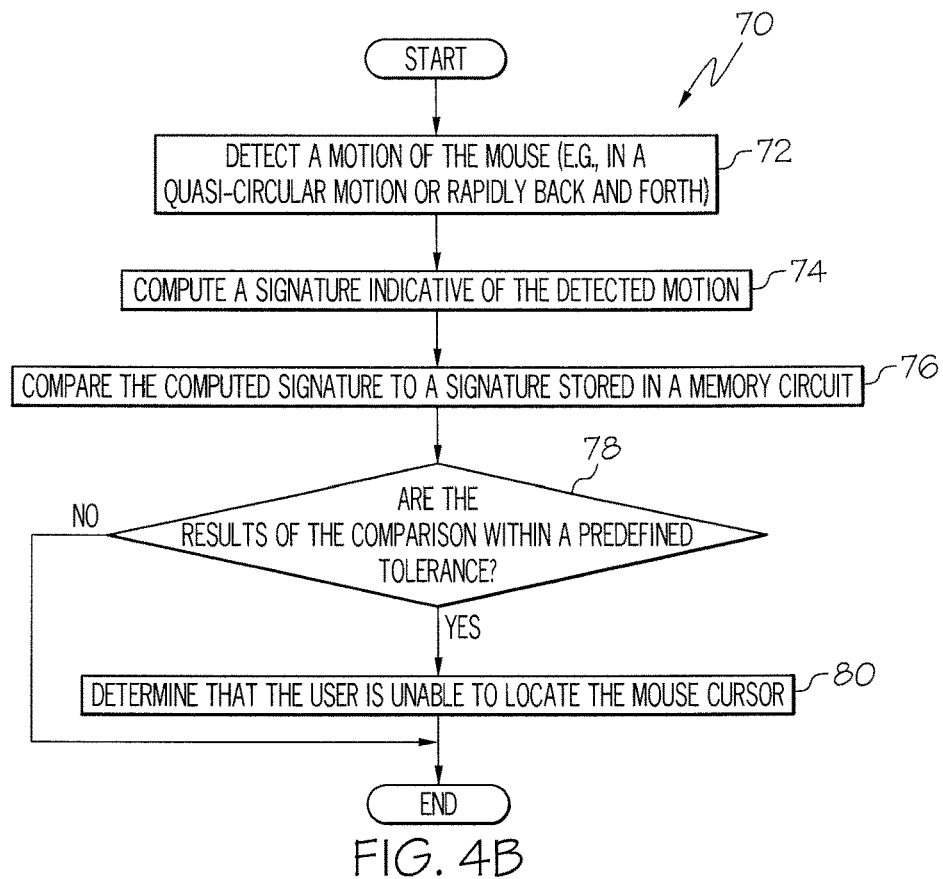

FIG. 4B illustrates a method 70 in which the user application determines that the user U has lost the location of the mouse cursor 20 on the display responsive to detecting a predetermined motion of the mouse device 16, such as when the user U moves the mouse device 16 in a quasi-circular motion or rapidly back and forth, according to one embodiment. Method 70 begins with the user application detecting motion of the mouse device 16 (box 72). Techniques for detecting mouse movement are well-known, and thus, not described in detail here. However, in one embodiment, the user application detects such motion responsive to receiving messages from the operating system (OS). By way of example only, such messages may be WM_MOUSEMOVE messages sent by the WINDOWS operating system to the user application as is known in the art.

Based on the information contained in these messages, the user application can further determine whether the motion comprises a quasi-circular motion, a rapid back and forth motion, or some other predetermined motion of the mouse device 16. For example, in one embodiment, the messages sent by the OS comprise the x-y coordinates of the tip of the mouse pointer 20 (e.g., the lParam parameter in the WM_MOVEMOUSE message). Upon receiving the messages, the user application can call well-known functions to extract the x and y coordinates of the mouse cursor 20 from such parameters, and then use the coordinate information to compute a "signature" indicative of the detected motion (box 74).

For example, the user application may perform mathematical operations on the extracted coordinates to determine a range of movement for the mouse device 16. The user application may, for example, detect that while the x-coordinates change, they remain substantially within the same range (e.g., ±500 pixels), and that the y-coordinate remains substantially the same (e.g., ±50 pixels). Alternatively, the user application may detect that the y-coordinate remains substantially within the same range (e.g., ±500 pixels), and that the x-coordinate remains substantially unchanged (e.g., ±50 pixels). If the results of the operations stayed as such for a predetermined time period, such as 1 second, for example, then the user application could utilize these x and y differential values values as the "signature" for the mouse device 20.

As another example, the user application may utilize the coordinate information carried by the messages to determine that the mouse device 16 is being moved within a circle. In this embodiment, the user application receiving the messages could perform mathematical operations on the x and y coordinates carried by the messages over time (e.g., 1 second), and determine that the user is moving the mouse device 16 in a substantially circular motion within some predefined area (e.g., 500 pixels). Still other embodiments may utilize the coordinate information to detect changes in a velocity and/or acceleration of the mouse device 16 relative to a predetermine time window, or to detect changes in distance and/or direction of the mouse device 16 within a predetermined time window. Regardless of the motion, however, each motion has a different "signature" indicating that particular motion for the mouse device 16.

Once the signature is computed, the user application may then compare the computed signature to one or more other signatures stored in memory (box 76). If the computed signature matches one of the stored signatures within a predefined tolerance (e.g., within 2%) (box 78), the user application may determine that the user is unable to locate the mouse cursor (box 80). Otherwise, the user application determines that the user is simply moving the mouse device 16 normally and the method ends.

Figure 4C:
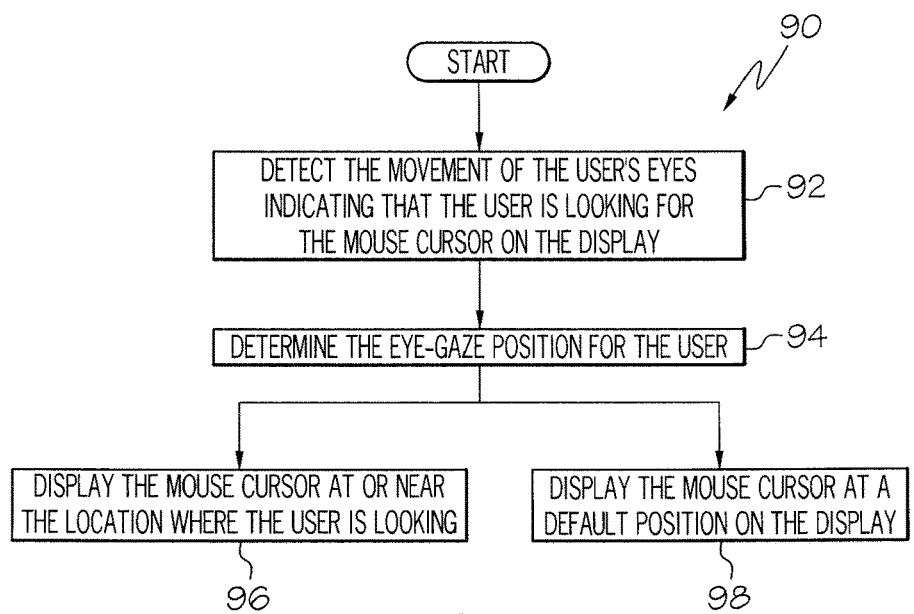

FIG. 4C illustrates a method 90 for conspicuously displaying the mouse cursor 20 on the display monitor 12 according to another embodiment of the present disclosure. Although method 90 may be utilized in single-display embodiments, this particular method may be especially helpful in multi-display embodiments.

Method 90 begins with the user application detecting a behavior indicating that the user U cannot locate the mouse cursor 20 on display monitor 12. In this embodiment, such detection is based on the rapid movement of the user's eyes as captured by one or more of the cameras 18 (box 92). For example, one or more of the cameras 18 may capture images of the user's U eye movements around a display monitor 12, or between multiple display monitors 12. In these cases, the user application would assume that the user U cannot locate the mouse cursor 20, and determine the current eye-gaze position for the user U (box 94), as previously described. Once the eye-gaze position is determined, the user application could utilize that information to generate the requisite messages to the OS to display the mouse cursor 20 in a conspicuous location on a selected, predetermined one of the display monitors 12 (box 96). Alternatively, the user application may generate the message to cause the computing device 10 to display the mouse cursor at a default location on one of the displays 12 (box 98).

Regardless of where the mouse cursor 20 is displayed, however, the methods of the present embodiments position the mouse cursor 20 at a location on a display monitor 12 (i.e., within the user's U field of view) such that the user U has an increased chance of finding the mouse cursor 20 on the display monitor 12.

The previous embodiments determine whether a user U has lost the position of a mouse cursor 20 based on the detected motion of the mouse device 16, or the detected movement of the user's U eyes. However, in another embodiment, the present disclosure makes this determination based on detecting the motion of the mouse device 16 in combination with detected eye movement. More particularly, the user application could be configured to detect the mouse movement, as previously described, and also to receive information from the camera indicating the user's U detected eye position, as previously described. The user application could then process this information, for example, by performing mathematical operations as previously described, and then determine whether the user has lost the mouse cursor 20 accordingly.

For example, the user application may determine that the user U is moving the mouse device 16 generally within the same area of the screen indicating a back and forth motion or a quasi-circular motion. The user application may also receive information from the camera indicating that the user's eyes are looking all around the display. The user application, in this embodiment, would then display the mouse cursor 20 at some predetermined location (e.g., a default location) based on the information received from both the mouse device 16 and the camera. Thus, the information from both the mouse device 16 and the camera indicate that the user U has lost the mouse cursor 20. Further, the use of indications from multiple sources could help the user application to make more accurate determinations as to whether the user has lost the mouse cursor 20.

Figure 5:
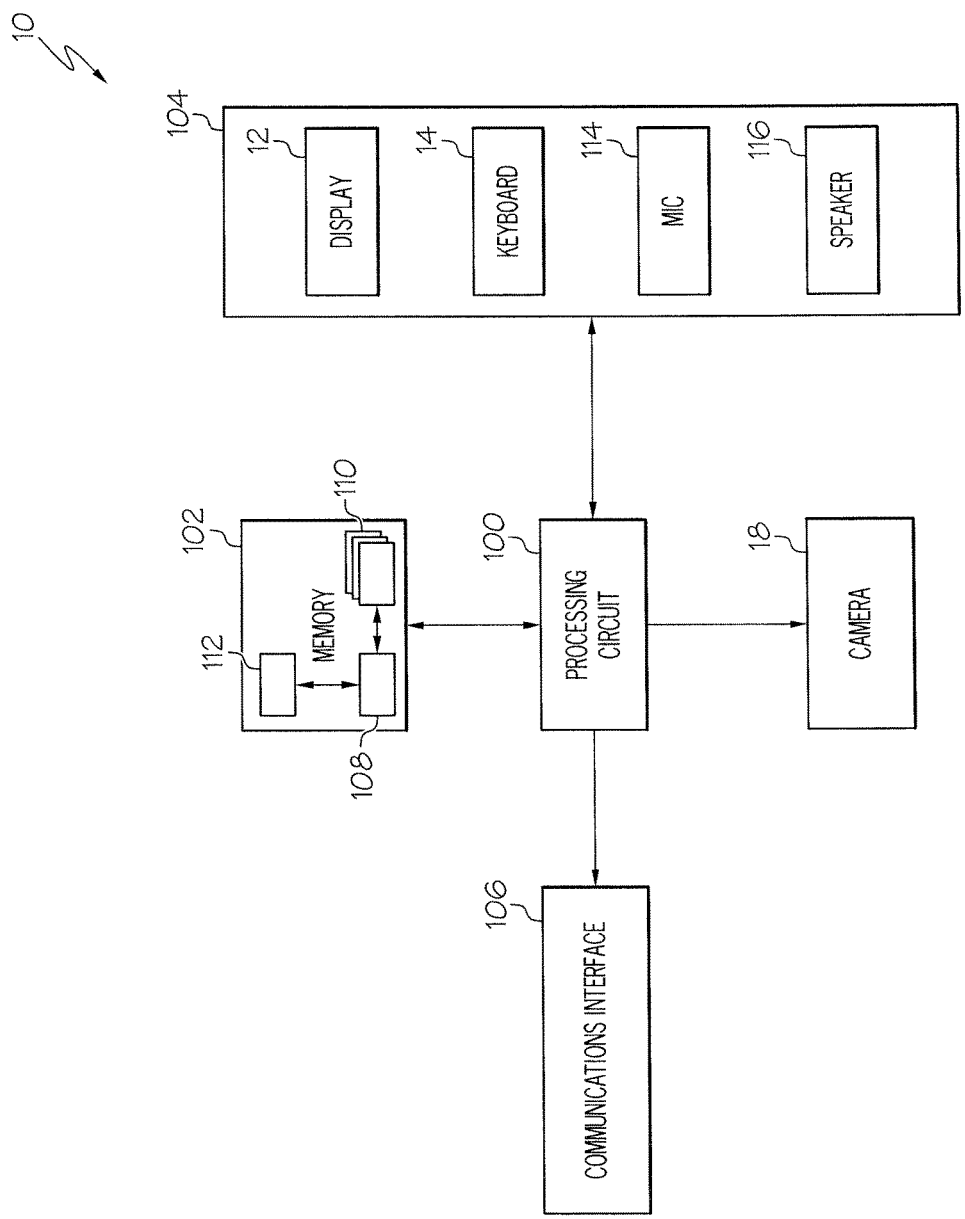
FIG. 5 is a block diagram illustrating some components of a computing device configured to function according to one or more aspects of the present disclosure.

FIG. 5 illustrates some of the components of a computing device 10 (or computing device 30) that is configured to function according to one or more embodiments of the present disclosure. As seen in FIG. 5, computing device 10 comprises a programmable processing circuit 100, a memory circuit 102, a user interface 104, a camera 18, and a communications interface 106.

The programmable processing circuit 100 comprises circuitry that may be implemented by one or more microprocessors, hardware, firmware, or a combination thereof, and generally controls the operation and functions of computing device 10 (or computing device 30). Such operations and functions include, but are not limited to, determining an eye-gaze position for a user in accordance with the logic and instructions of an eye-gaze software program 108, as well as rendering the mouse cursor 20 in a conspicuous location on display 12 as previously described.

Memory circuit 102 is also circuitry that may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 102 stores programs and instructions, such as eye-gaze software program 108, as well as user applications 110 and data 112 related to the eye-gaze application 108. The eye-gaze application 108, when executed by the programmable processing circuit 100, controls the programmable processing circuit 100 to determine an eye-gaze position for a user previously described.

The user I/O interface 104 comprises the components that enable the user to interact with the user applications 110 executing on device 10. As seen in FIG. 5, these components include the display monitor 12, the keyboard 14, a microphone 114, and an audio output device such as speaker 116. Other components may also be part of the user I/O interface 104 such as the mouse device 16, seen in FIG. 1.

The camera 18 may be any camera circuitry known in the art, and comprises well-known components, such as a lens, etc. However, according to the present disclosure, camera 18 may be controlled in accordance with the eye-gaze software program 108 executed by programmable processing circuit 100 to capture images of the user's eye movement. Based on an analysis of these images, the eye-gaze software program 108 is able to determine the eye-gaze position for the user as previously described.

The communications interface 106 allows the computing device 10 to communicate with remote devices, such as various network and application servers (not shown) and other client devices. To that end, communications interface 106 may comprise an interface that transmits and receives data and signals according to any of a variety of known protocols. Such an interface may include, but is not limited to, an ETHERNET component capable of communicating data and information over a data communications network or a wireless LAN (802.11x) interface.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   detecting that a user is unable to locate a cursor on a display monitor connected to a computing device, wherein detecting that a user is unable to locate a cursor comprises:
      detecting rapid eye movements of the user's eyes;
      detecting a motion associated with a pointer device connected to the computing device;
      computing a signature indicative of the motion of the pointer device;
      comparing the computed signature to a stored signature; and
      determining that the user cannot locate the cursor on the display monitor based on the rapid eye movements and on a result of the comparing;
   responsive to detecting that the user is unable to locate the cursor on the display monitor, performing an eye-gaze position procedure to determine an eye-gaze position for the user, the eye-gaze position comprising a location on the display monitor; and
   displaying the cursor at the determined eye-gaze position on the display monitor to the user.

2. The computer-implemented method of claim 1 wherein performing an eye-gaze position procedure to determine an eye-gaze position for the user comprises retrieving, from a file stored in a memory, coordinates identifying a predetermined location on the display monitor, and wherein displaying the cursor at the determined eye-gaze position on the display monitor comprises displaying the cursor at the predetermined.

3. The computer-implemented method of claim 1 wherein the display monitor comprises a first display monitor of a plurality of display monitors connected to the computing device, and wherein performing an eye-gaze position procedure to determine an eye-gaze position for the user comprises:
   identifying which of the plurality of display monitors the user is currently looking at.

4. The computer-implemented method of claim 3 wherein displaying the cursor to the user based on the determined eye-gaze position comprises displaying the cursor at the determined eye-gaze position on the identified display monitor.

5. The computer-implemented method of claim 3 wherein identifying which of the plurality of display monitors the user is currently looking at comprises:
   capturing images of the user's eyes using a plurality of camera devices, each camera device being associated with a corresponding display monitor in the plurality of display monitors;
   processing the images; and
   identifying which of the plurality of display monitors the user is currently looking at based on the processed images.

6. The method of claim 1 wherein the determined eye-gaze position comprises display coordinates identify the location at which the user last looked on the display.

7. The method of claim 6 further comprising tracking locations on the display at which the user looks and storing the locations in a file in a memory, and wherein performing an eye-gaze position procedure to determine an eye-gaze position for the user comprises retrieving the display coordinates identifying the location at which the user last looked from the file.

8. A computing device comprising:
   a display monitor;
   a camera configured to capture images of a user's eye;
   a memory circuit configured to store an eye-gaze application program, wherein the eye-gaze program receives an image of the user's eye captured by the camera; and
   a programmable processing circuit communicatively connected to the display monitor, the camera, and the memory, and configured to:
      detect rapid eye movements of the user's eye based on the images of the user's eye captured by the camera;
      detect a motion associated with a pointer device connected to the computing device;
      compute a signature indicative of the motion of the pointer device;
      compare the computed signature to a stored signature;
      determine that the user is unable to locate a cursor on the display monitor based on the rapid eye movements of the user and on a result of the comparison;
      determine that the user is unable to locate a cursor on the display monitor based on the rapid eye movements of the user;
      responsive to determining that the user is unable to locate the cursor on the display monitor, perform an eye-gaze position procedure to determine an eye-gaze position for the user, the eye-gaze position being based on the image of the user's eye captured by the camera, and comprising a location on the display monitor; and
      display the cursor at the determined eye-gaze position on the display monitor to the user.

9. The computing device of claim 8 wherein the programmable processing circuit is further configured to display the cursor at a predetermined location on the display monitor.

10. The computing device of claim 8 further comprising a plurality of display monitors, each display monitor including a corresponding camera device configured to capture images of the user's eyes, and wherein the programmable processing circuit is further configured to:
    process the images of the user's eyes captured by at least one of the cameras;
    identify which of the plurality of display monitors the user is currently looking at based on the processed images; and
    display the cursor at the determined eye-gaze position on the identified display monitor.

11. The computing device of claim 8 wherein the determined eye-gaze position comprises display coordinates identify the location at which the user last looked on the display.

12. The computing device of claim 11 wherein the programmable processing circuit is further configured to:
    track locations on the display at which the user looks;
    store the locations as display coordinates in a file in a memory; and
    retrieve the display coordinates corresponding to the location at which the user last looked from the file.

13. A computer program product comprising:
    a computer readable storage medium configured to store a control application that, when executed by a computing device, configures a programmable processing circuit associated with the computing device to:
       detect rapid eye movements of a user's eye based on images of the user's eye;

detect a motion associated with a pointer device connected to the computing device;
compute a signature indicative of the motion of the pointer device;
compare the computed signature to a stored signature;
determine that the user is unable to locate a cursor on a display monitor based on the rapid eye movements of the user and on a result of the comparison;
determine that the user is unable to locate a cursor on a display monitor based on the rapid eye movements of the user;
responsive to determining that the user is unable to locate the cursor on the display monitor, perform an eye-gaze position procedure to determine an eye-gaze position for the user, the eye-gaze position being based on the image of the user's eye captured by the camera, and comprising a location on the display monitor; and
display the cursor at the determined eye-gaze position on the display monitor to the user.

14. The computer program product of claim 13 wherein to perform an eye-gaze position procedure, the control application further configures the programmable processing circuit to retrieve, from a file stored in a memory, coordinates identifying a predetermined location on the display monitor.

15. The computer program product of claim 14 wherein the control application further configures the programmable processing circuit to display the cursor on the display monitor at the predetermined location.

16. The computer program product of claim 13 wherein the display monitor comprises a first display monitor of a plurality of display monitors connected to the computing device, and wherein the programmable processing circuit is further configured to:
process the images of the user's eyes captured by at least one of the cameras;
identify which of the plurality of display monitors the user is currently looking at based on the processed images; and
display the cursor at the determined eye-gaze position on the identified display monitor.

17. The computer program product of claim 13 wherein the control application further configures the programmable processing circuit to determine the eye-gaze position to be display coordinates identifying the location at which the user last looked on the display.

* * * * *